Nov. 10, 1953                J. C. NEEDHAM ET AL                2,659,036
ALTERNATING CURRENT ARC WELDING EQUIPMENT
Filed Aug. 7, 1951                                           4 Sheets-Sheet 1
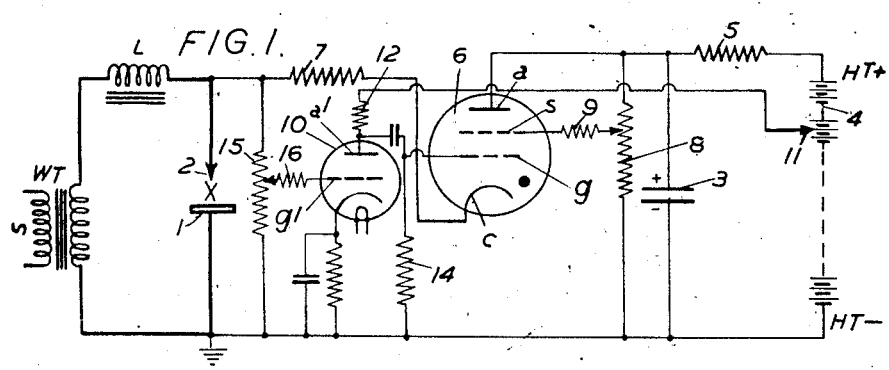
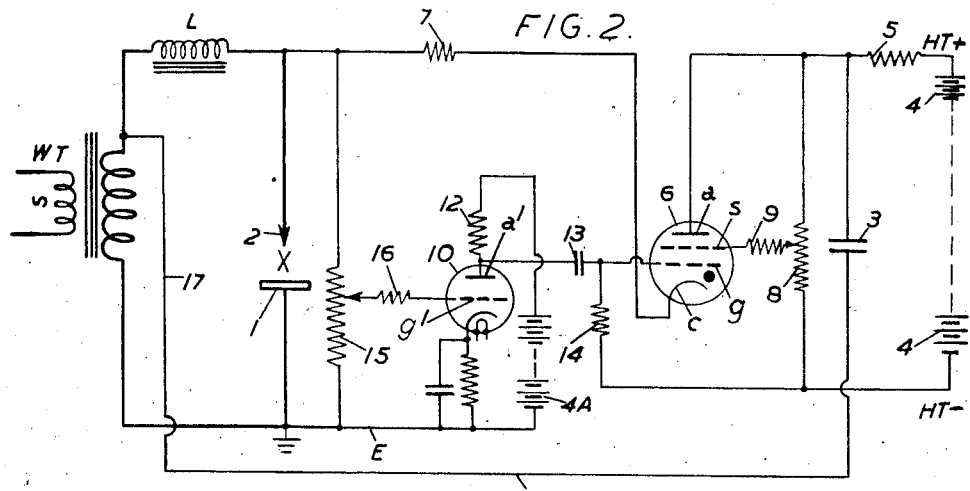
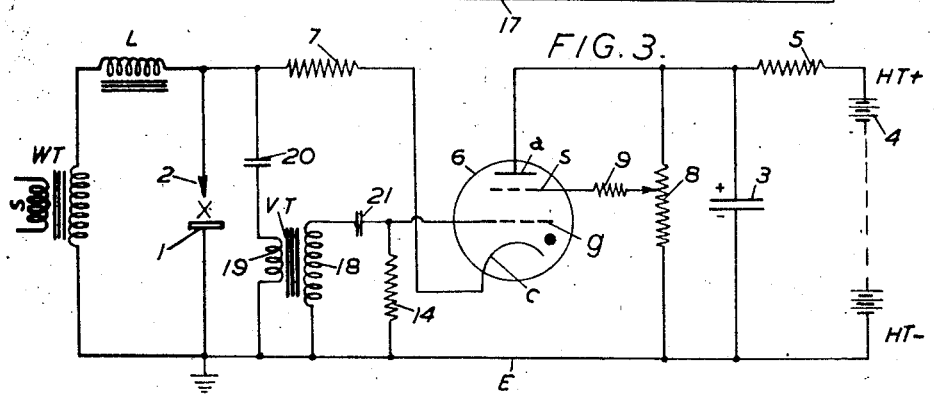
Inventors
James C. Needham
Leonard H. H. Orton
By Ralph B. Stewart
Attorney

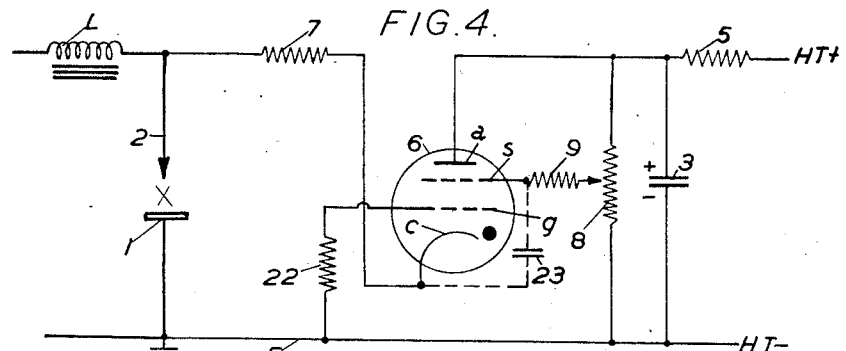
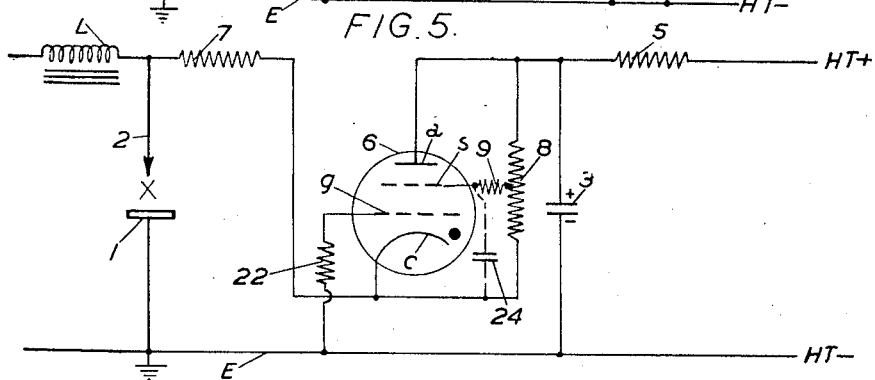
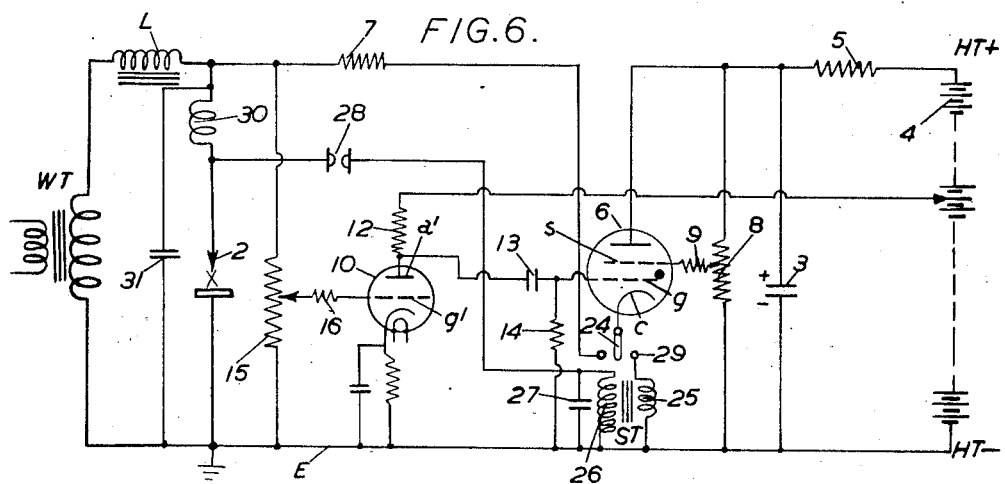

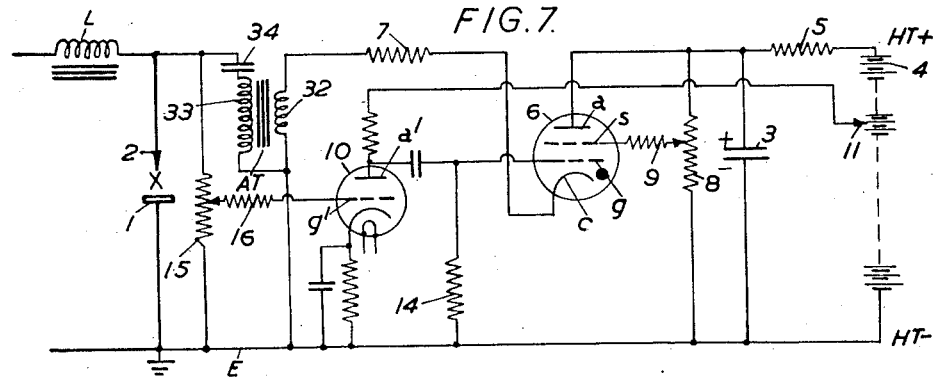
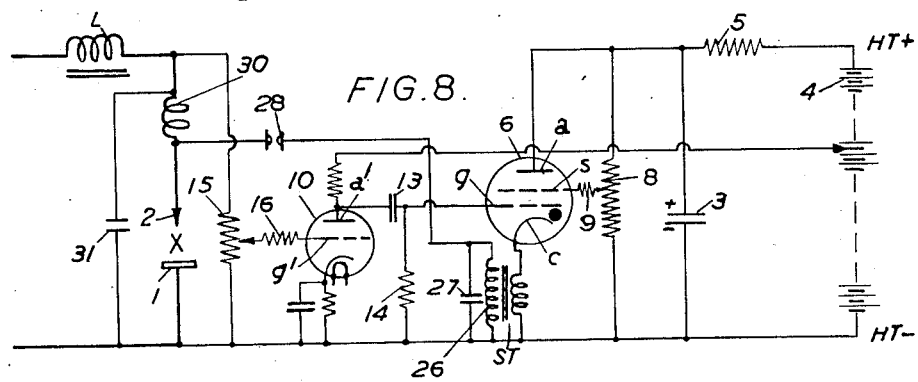
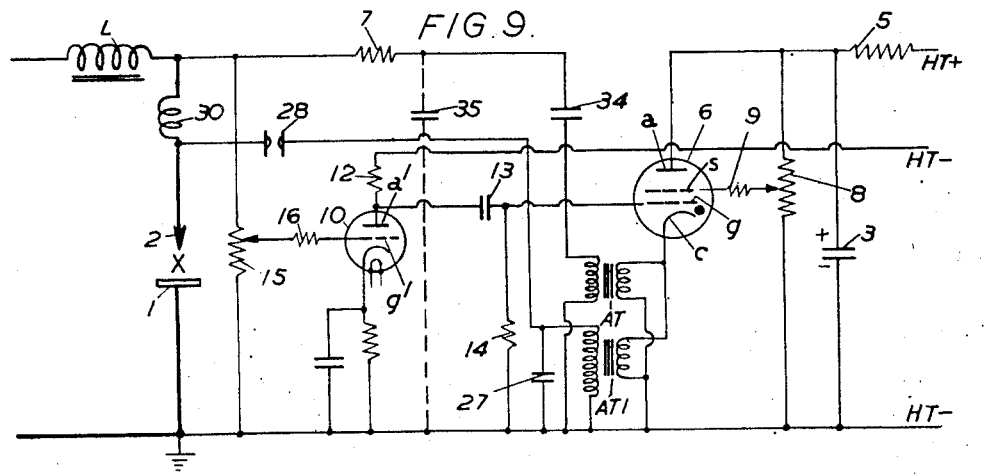

Nov. 10, 1953  J. C. NEEDHAM ET AL  2,659,036
ALTERNATING CURRENT ARC WELDING EQUIPMENT
Filed Aug. 7, 1951  4 Sheets-Sheet 4
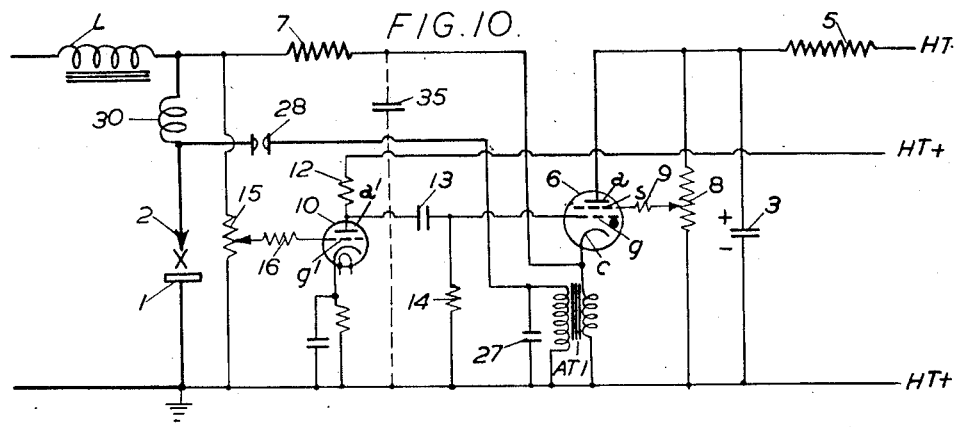
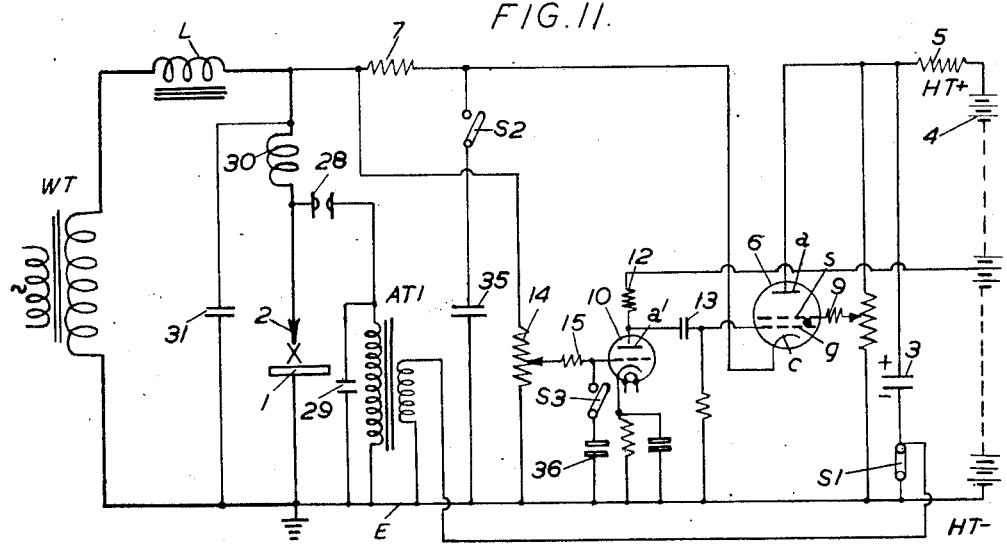
Inventors
James C. Needham
Leonard H. H. Orton
By Ralph B. Stewart
Attorney Patented Nov. 10, 1953

2,659,036

UNITED STATES PATENT OFFICE 2,659,036

ALTERNATING CURRENT ARC WELDING EQUIPMENT

James Christopher Needham and Leonard Herbert Humphrey Orton, Greenford, England, assignors to E. R. A. Patents Ltd.

Application August 7, 1951, Serial No. 240,726

Claims priority, application Great Britain August 11, 1950

15 Claims. (Cl. 315—163)

This invention relates to equipment for electric arc welding and particularly alternating current arc welding and, in particular, to a simple effective apparatus for stabilising and maintaining the arc used in such welding.

The invention can be employed in any arc welding where it is desired to work with the open-circuit voltage as low as possible but it is particularly useful in the alternating current arc welding of metals such as aluminium or its alloys in an argon atmosphere in which at reduced open-circuit voltages, there is a tendency to rectifying action or for the arc to fail to reignite at the start of the half cycles of current in which the metal in question is the cathode. In the process of welding aluminium in an atmosphere of argon or other inert gas, auxiliary means are often employed to reignite the arc for the alternate half cycles in which the rectifying action tends to occur. One common form of such auxiliary means consists of a source of high frequency sparks applied across the arc gap. Such a high frequency spark injector is open to various objections. Thus, it is liable to cause interference with radio apparatus in the neighbourhood. Consequently, it is often the practice to switch off the spark injector once the arc has been established so as to avoid undue radio interference but such procedure necessitates the use of a high open-circuit voltage to maintain the arc. Such spark injectors require the use of high voltage sources and also of spark gaps which need adjustment and periodic cleaning. Timing of the sparks to the commencement of the rectifying half cycle cannot be regulated in typical spark oscillators to greater accuracy than the time interval between successive sparks which is commonly about an interval of the order of a millisecond. Such a delay of a millisecond between the zero of current and the reignition of the arc is sufficient to result in a marked decrease in the effective half cycle of current.

Other known methods of reigniting the arc depend upon the provision of electron valve oscillator units for injecting a high frequency voltage into the arc and such apparatus while giving rise to interference with neighbouring radio apparatus can be arranged to restrict such interference to a permitted band of frequencies. Such apparatus, however, is of necessity relatively complicated in design.

The main object of the present invention is to provide an improved auxiliary apparatus for reignition of the welding arc which avoids most or all of the above drawbacks.

According to the invention, the auxiliary apparatus consists of a low voltage source of power of the correct polarity, a switch for connecting that source to the arc and a timing device arranged to time the connection of the low power source to the arc. The timing device may, for example, be initiated by the rise in voltage across the arc gap, a marked increase in the resistance of the arc, the occurrence of zero current in the arc and so forth.

In a preferred form, the source of power is a continuously recharged condenser with an impedance for controlling its discharge, a gas discharge tube is used as the switch and an electron valve controlled by the voltage across the arc serves as the timing device by rendering the gas discharge tube conductive. However, other forms of apparatus may be employed according to the invention, for example, a transformer may be used as the timing device instead of the electron valve or an electromechanical switch instead of the gas discharge tube.

By the present invention, a low voltage surge is injected to reignite the arc and such arrangement exhibits the following advantages as compared with the previous apparatus already referred to.

Radio interference is absent and therefore the apparatus may be kept in continuous operation throughout the welding. The welding transformer may then be operated at a substantially lower open-circuit voltage with the result that there is an increased safety to personnel, lower capital costs, improved power factor and lower power consumption. The invention enables aluminium and its alloys as well as other metals to be welded in an atmosphere of argon by the use of transformers of inherently unsuitable design such as certain leaky reactance transformers at an open-circuit voltage well within the range generally approved. Thus alternating current argon arcs can be maintained to aluminium and its alloys or to copper at an open circuit voltage of less than 50 volts R. M. S. The apparatus may be connected in any welding circuit without the necessity for auxiliary equipment housed in the welding torch. The design can be simple and the apparatus can be easily housed within a composite welding set or provided as an independent unit of small dimensions for use with existing welding equipment. There are no high voltage sources. Faulty phasing or timing of the injected impulses or surges cannot occur since the impulse can be timed to occur on the recovery voltage transient, thereby ensuring a full half cycle of welding current. Surges of either one or both polarities can be derived as required. No apparatus which requires heavy servicing and maintenance is employed.

By providing additional circuit connections, the apparatus may be arranged to initiate the welding arc across a cold gap without the necessity of touching the electrode on to the work.

The additional connections required for initiating the arc across a cold gap only need to be used for a brief time at the start of welding and can then be switched out, since by the use of the present invention, the arc continues to be reignited once it has been struck. The device for starting the arc across a cold gap produces only a single spark at each half cycle concerned and therefore, gives rise to less radio interference than devices in which a number of high frequency sparks are injected per half cycle.

In carrying out the present invention, a transformer may be interposed between the surge injector unit and the welding circuit, and then by choice of a suitable matching transformer, the equipment can be rendered suitable for the electrical characteristics of different welding arcs and circuits. In fact, such an intermediate transformer between the surge unit and the arc affords a number of possibilities of arranging the apparatus in accordance with the present invention.

Continuous reversal of the connections by say, a synchronous relay provides surges of alternate polarities from the same condenser at each half cycle of the power supply. Moreover, if a step-up transformer is used a surge of greater voltage can be applied to the arc. In the apparatus according to the present invention with a simple direct connected surge unit as described above, if the condenser of the surge unit is charged, say to 300 volts, the arc is subjected to a surge of only about 200 volts owing to loss in the discharge tube switch, the series resistance for controlling the surge and also to the fact that the welding circuit is of low impedance, for example of the order of 1 ohm at a frequency of 50 cycles per seeond, but by using a step-up transformer, the surge voltage applied to the arc can be increased as desired.

Incidentally, such a high voltage transformer can be used for breaking down a spark gap so as to apply a high frequency spark to the cold arc gap to start the arc.

A surge transformer employed in accordance with the present invention makes it possible to reduce the effect of the open-circuit voltage used for welding on the gas-discharge tube used as a switch. For if a step-up stransformer is employed, the open circuit voltage for welding is obviously stepped down to the surge unit. This is important if the surge injecting unit is to be used with a welding transformer providing an unnecessarily high open-circuit voltage because in the arrangement already described, the timing circuits have to accommodate a wide range of potentials on the various electrodes of the valves while self-firing of the switch valve at random must be avoided.

Another possibility in accordance with the invention, is to use a transformer with more than one, and particularly two, secondary windings between the surge injecting unit and the welding electrodes.

For example, a transformer may be employed with a primary winding connected to the condenser used as the source through a gas discharge tube or other form of switch, while the transformer has one secondary winding producing, say a one to one ratio and the other producing a relatively high step-up ratio.

If it be assumed that the secondary winding of the one to one ratio be connected across the arc electrodes in series with a limiting impedance, and the high tension secondary be connected through a spark gap to the welding electrodes, a radio frequency choke being provided in the unearthed supply line to prevent a high frequency, high voltage surge when the spark gap breaks down from passing back to the source of supply, the action takes places in the following sequence.

The voltage across the high tension secondary winding breaks down the spark gap in series with it, and also the cold arc gap and a small condenser across that secondary winding very rapidly discharges through the arc gap which thus becomes ionized. Then a larger condenser across the other secondary winding discharges into the ionized gap establishing the arc and maintaining it until it is fully supplied from the power circuit. Subsequently, when the arc is hot and the gas discharge tube switch is tripped, the larger condenser which is charged to the lower voltage discharges into the hot arc gap before the voltage from the step-up transformer secondary necessary to break down the spark gap is reached. The charge in the high voltage secondary circuit can also feed into the hot arc gap through the low voltage winding of the transformer.

The transformer secondary windings can be mounted on a single iron core or may be provided on separate transformers, but as one of the transformers has a one to one ratio, the arrangement can be simplified and yet produce a similar result. Then the larger condenser could be connected across the primary winding of a high voltage transformer so as to be connected to the welding electrodes through a limiting impedance, and the secondary high tension winding bridged by the smaller condenser can be connected in series with the spark gap to the welding electrodes. In that case the larger condenser in the primary circuit and the smaller condenser in the secondary circuit can operate in the same sequence as that described above. Similarly the primary winding of the high voltage transformer may be connected in series with the surge.

In order that the invention may be clearly understood and readily carried into effect, some examples of welding apparatus according to the present invention will now be described with reference to the accompanying drawings, in which the different figures are circuit diagrams of the different examples.

In these examples, the connections are such as to produce a positive surge for reignition of a welding arc in an inert gas at each half cycle of reverse polarity. The connections can, however, be modified to produce in the welding circuit negative surges or positive and negative surges alternately.

In Figure 1, the welding transformer WT is connected in the usual way through a limiting choke L, which may be built into the transformer, to the arc between the aluminium work-piece 1 to be welded and the electrode 2, the arc being assumed to be formed in an atmosphere of argon. A condenser 3 having a capacity, for example, of 4 mfds. is shown charged continuously from a source 4 through a charging resistance 5, for example of 2,500 ohms. The source 4 is illustrated diagrammatically as a battery giving a positive supply of say, 450 volts to the upper plate of the condenser 3 but, of course, may be derived from a transformer and rectifier unit with or without smoothing components. The condenser 3 is connected across or in parallel with the arc 1, 2 through a gas discharge tube 6 and a resistor 7 say, of 5 ohms. The discharge tube 6 is a cold cathode gas-filled tetrode such as an N. S. P. T. tube and serves as the switch for the surge injector. Other forms of switch may, of course, be used but the advantage of the cold cathode gas discharge tube over a mechanical or electro-mechanical switch is that it is more precise and controlable in timing because it is electronic, and it has the advantage over a hot cathode thyratron tube that there is no delay due to heating up. More usual types of electron tubes are not of sufficiently low impedance.

The positive plate of the condenser 3 is connected to the anode $a$ of the tube 6 and the cathode $c$ of the tube is connected to the welding electrode 2, while the negative plate of the condenser 3 is connected directly to the earth line E and to the work-piece 1 so as to apply a direct current surge of the correct polarity to the arc to assist in reigniting the latter at the beginning of each reverse half cycle.

In the particular example under consideration, the screen grid $s$ is maintained at a suitable potential by connection to a potentiometer 8, say of 50,000 ohms, through a resistance 9 of 10,000 ohms and the control grid $g$ of the tube 6 is arranged to have a negative potential applied to it to render the tube conducting, that is to say, to close the switch and to start the discharge through the tube 6 to the welding circuit. The control of the grid $g$ is effected by an electron triode 10 whose anode $a'$ is supplied from a point 11 in the direct current source affording a potential of say 300 volts through an anode resistance 12 of say, 30,000 ohms. The anode $a'$ is also connected to the control grid $g$ of the gas discharge tube 6 through a condenser 13 of 0.01 mfd. capacity with a resistance 14 of 10,000 ohms connected between the grid $g$ and the earth line E; the tube 10 is controlled from a tapping in a potential divider 15 of 50,000 ohms connected across the welding arc 1, 2. The control grid $g'$ of the triode 10 is connected through a resistor 16 of 100,000 ohms to the tapping in the potential divider 15 which is selected so that when the arc tends to become extinguished, the triode 10 is biased and becomes conductive; thereby its anode potential is depressed and is transmitted to the grid $g$ of the discharge tube 6 which thereupon becomes conductive as already described so that the condenser 3 discharges through the controlling resistor 7 to the arc 1, 2. The arc 1, 2 is thereby reignited and is maintained during the ensuing half cycle by power from the source of welding supply WT.

In the example shown in Figure 2, the components are generally the same and have been given the same reference characters. The only difference now is that the connections are such as to provide series surge injection, the negative plate of the condenser 3 being connected by a conductor 17 to the unearthed side of the secondary winding of the welding transformer WT, and the triode 10 is shown supplied from an anode source 4A which is independent of the battery 4. Therefore the path of the surge is from the positive plate of the condenser 3 through the gas discharge tube 6 forming the switch, the controlling resistor 7, the arc 1, 2, the secondary winding of the transformer WT, and returning by the conductor 17 to the condenser 3. Thus, in this case, the voltage of the condenser 3 is applied to the arc in series with that of the secondary winding of the welding transformer WT.

In Figure 3, a system is shown in which tripping is effected by a voltage transformer VT instead of by the triode 10 and its circuits which are shown in Figures 1 and 2. The surge connection is a parallel connection as in Figure 1 but this method of tripping, and the others to be described, can equally well be used with the series surge injector circuit shown in Figure 2. Thus, the welding circuit and the connections of the gas discharge switch tube 6 to the arc are the same as in Figure 1 and the same reference characters have been employed.

In this case, however, the secondary winding 18 of the voltage transformer VT is connected across the resistance 14 which is connected between the control grid $g$ of the gas discharge tube 6 and the earth line E connected to the negative plate of the condenser 3. The primary winding 19 of the transformer VT is shown connected through a condenser 20 across the welding arc. Thus, as the potential across the arc 1, 2 commences to rise, current flows through the primary winding 19 and the potential of the secondary winding 18 is applied to the grid $g$ of the gas discharge tube 6 to ignite the latter. In other respects, the system works as described for Figure 1.

The circuits shown in Figure 3 could obviously be slightly modified to ignite the tube 6 by applying a positive voltage impulse to the screen grid $s$ of the gas discharge tube 6 instead of applying a negative impulse to the control grid $g$. The only difference is that the appropriate end of the secondary winding 18 would be connected through a condenser such as the condenser 21, to the screen grid $s$, and the other end of the secondary winding 18 connected to the earth line E.

In the further example shown in Figure 4, the system is generally the same as in Figures 1 and 3, and the same reference characters have been employed. The difference is that the gas discharge tube 6 is connected so as to be self-tripping due to the welding circuit potential on its cathode $c$. Its control grid $g$ is connected through a grid resistance 22 to the earth line E and thence to the negative plate of the surge condenser 3, and its screen grid $s$ is connected through a resistor 9 to a tap in the potential divider 8 as before. A condenser 23 could be used connected, as shown in dotted lines, between the cathode $c$ and the screen grid $s$ to pass the transient voltage of the cathode $c$ direct to the screen grid $s$.

A slight modification of the arrangement shown in Figure 4 is illustrated in Figure 5, in which the arc circuit and the surge injector circuit are as in Figures 1, 3 and 4 and the same reference characters have been employed. In this case, the screen grid potential divider 8 is connected between the anode $a$ and the cathode $c$ of the gas discharge switch tube 6, the screen grid $s$ as before being connected through a resistor 9 to the tapping of the potential divider 8. With this connection, when the arc is extinguished and the potential of the cathode $c$ rises, the potential between the control grid $g$ and the screen grid $s$ is increased and the discharge tube 6 tripped. A small condenser 24, say of 0.01 mfd. capacity and similar to the condenser 23 in Figure 4, may be connected between the cathode c and the screen grid s as indicated in dotted lines.

In some cases, it is not desirable to touch the welding electrode 2 on the work-piece 1 and then other means may be provided for starting the arc. In Figure 6, an arrangement for that purpose is shown applied to the welding system illustrated in Figure 4. The method of tripping shown in this case is by means of an electron triode 10 as in Figures 1 and 2, but in this and examples to be described later, the alternative method of transformer tripping as shown in Figure 3 or where suitable, self-tripping as shown in Figures 4 and 5 may be employed. In Figure 6 the surge condenser 3 and the gas discharge tube 6 are arranged for starting the arc to be connected by a switch 24 to the primary winding 25 of a high voltage transformer ST, while the secondary winding 26 of that transformer is shunted by a condenser 27 of say, 0.01 mfd. and connected through a spark gap 28 across the supply leads of the welding electrodes 1, 2. On closing the switch 24 on to its contact 29, the transformer ST generates a voltage to break down the spark gap 28 and thus to initiate the arc. The resulting high frequency spark is prevented from passing back to the welding transformer WT by inserting a radio-frequency choke coil 30 between the welding transformer WT and the spark gap 28 with a high frequency by-pass condenser 31 connected across the main welding circuit.

Apart from the range afforded by the alternatives already described and by the choice of dimensions, the application of a surge injector unit can be increased by introducing a surge transformer between the unit and the welding circuit proper, and such a transformer may match the surge set up to the requirements for reignition of different arcs. An example is illustrated in Figure 7 in which such a matching transformer AT is introduced. The circuit in Figure 7 is similar to that of Figure 1 in regard to the condenser 3 and its supply circuit and the tripping of the switch discharge tube 6 by the electron triode 10. The surge controlled by the discharge tube 6 in Figure 7 flows through the controlling resistance 7 and the primary winding 32 of the transformer AT which is a step-up transformer which is useful in cases where the inherent voltage of the surge is limited, for example, by the break-down potential of the discharge tube 6. Such a transformer may also compensate for losses in the switch discharge tube 6 and the impedance 7, which result in the voltage applied to the arc 1, 2 being less than that available at the condenser 3. The secondary winding 33 of the transformer AT is, as illustrated used with a series condenser 34 of such a capacity that the surge at the step-up voltage is relatively freely passed into the welding circuit, whereas the voltage of the mains frequency is attenuated by this condenser as far as the injector unit is concerned. If it is desired to increase the magnitude and duration of the current fed to the arc from the condenser 3, the transformer AT may be a step-up transformer.

In Figure 8, another example is shown in which the output from the secondary winding 26 of the transformer ST charges up a small high voltage condenser 27, say of 0.001 mfd. capacity, in a similar manner to the condenser 27 in Figure 6, and the surge from the condenser 27 is very suddenly applied to the arc 1, 2 by the break-down of a pulse sharpening spark gap 28. In this way, high voltage sparks may be produced from a low voltage surge and the voltage of the sparks is determined by the setting of the spark gap 28 up to the maximum available from the transformer ST and the small condenser 27. The spark may be timed in relation to the open circuit voltage or arc conditions to produce the best conditions of initiating the arc by the adjustment of the tripping circuit for the switch tube 6. In Figure 8, it will be noticed that this switch tube is arranged for tripping by the electron triode 10 as in Figure 1.

The effectiveness of initiating the arc by means of a spark as just described is greatly increased if the spark is combined with a surge taking place at the same time. The surge provides the current passing into the gap newly ionized by the spark until the power welding circuit can take over, whereas the latter does not always readily follow up the break-down of the arc gap by the spark. The surge should be timed to occur, say, a few microseconds before the spark since the latter is of very short duration.

In Figure 9, a circuit arrangement is shown in which there are two transformers fed by a single condenser 3 and switch discharge tube 6. The transformer AT produces the surge through the resistance 7 in its secondary circuit and the transformer AT1 produces the high voltage to which the small condenser 27 is charged for breaking down the spark gap 28 and applying the sparks to the arc circuit. The primary windings of the transformers AT and AT1 are shown connected in parallel to receive the discharge current from the condenser 3 but it will be realised that they can equally well be connected in series and, in fact, the windings of the two transformers could be placed on the same core. The low ratio transformer AT for transmitting the surge may have a condenser, say of 1 mfd., in parallel with its secondary winding as shown in dotted lines at 35, to store some of the input surge energy and to discharge into the arc 1, 2 when the gap has been ionized by the spark from the transformer AT1 and condenser 27. The low ratio surge transformer AT may also have a condenser 34 in series with its secondary winding as in Figure 7 to pass the surge but to attenuate the main frequency voltage.

Another small modification is shown in Figure 10, where the low voltage transformer AT is not used but the primary winding of the spark producing transformer AT1 is connected in parallel with the surge injector unit comprising the condenser 3, switch discharge tube 6 and controlling resistance 7, and the welding circuit itself. If required a condenser 35 may be included in parallel with the surge injector unit as shown in dotted lines similar to the condenser 35 in Figure 9.

As a small modification, the primary winding of the spark-producing transformer AT1 may be connected in the surge circuit in series with the resistance 7. With a suitable transformer arrangement, the above circuit arrangements for producing a low voltage surge and a spark can provide automatic change over from spark ignition to surge reignition of the arc. Thus, when the arc is cold or not sufficiently ionized, the surge fails to break down the gap but, a spark is produced which does break down the arc gap and starts an arc, and when the arc gap is sufficiently hot, the low voltage surge can reignite the arc before the spark voltage is built up and, in addition, with certain transformer arrangements, the energy in the spark circuit is then returned to the surge and hence to the arc by transformer action. Furthermore, it is possible to change over from spark initiation to surge reignition, for example, in the circuit shown in Figure 9, by switching out either the transformer AT or the transformer AT1, by means for example, of an electro-mechanical relay operated by the current or voltage in the welding circuit.

Finally, in Figure 11 a circuit arrangement is shown for producing a combined surge and spark producing operation of the apparatus with switch change-over to surge reignition of the welding arc operation alone. The primary winding of the spark-producing transformer AT1 is connected in series with the surge circuit and may be a standard motor car ignition coil, with a high voltage condenser 27 of 0.001 mfd. capacity connected across its secondary winding and connected to the arc gap 1, 2 through a spark gap 28 with the high frequency choke coil 30 and by-pass condenser 31 to prevent the spark from being applied to the main power transformer WT and choke coil L. The primary winding of the spark transformer AT1 is energised by opening the switch S1. The surge injector, as before, comprises a condenser 3, switch discharge tube 6 and controlling resistance 7, and has another condenser 35 of say, 4 mfd. capacity to store some of the surge energy, connected in parallel with the applied surge between the switch tube 6 and the resistance 7 by closing the switch S2. The surge-storing condenser 35 enables the high voltage surge on the condenser 29 to be built up to apply a spark to the welding circuit approximately at the instant of the peak of the applied surge voltage. In addition, the tripping or timing circuits to the switch discharge tube 6 are altered so as to cause the spark to be applied approximately at the instant of the peak of the mains frequency welding circuit voltage when the arc gap requires a spark, but so as to cause a surge to be applied as soon as the arc commences to become extinguished where the surge alone is used to reignite the arc. This is accomplished in Figure 11 by closing the switch S3 which connects a condenser 36, say of 0.02 mfd. capacity between the grid g' of the tripping triode 10 and the earth line E to delay the application of the potential to that grid from the potential divider 14 and resistance 15.

Alternatively, a resistance of say, 100,000 ohms may be inserted between the grid g' of the tripping triode 10 and the earth line E so as to reduce the applied potential to that grid.

The change-over from surge injection only to a surge combined with a spark for igniting the arc when the gap is too highly de-ionized is carried out by closing the switches S2 and S3 and opening the switch S1. This may readily be automatically carried out by a relay controlled by the voltage across the arc gap 1, 2. Such relay is designed to be energized by the welding open-circuit voltage, but not to be operated by the arc voltage.

What we claim is:

1. In an alternating current arc-welding system, the combination of a pair of arc-welding electrodes connected to a source of alternating current, a source of direct current, a normally open circuit extending between said source of direct current and said arc for applying across said electrodes a unidirectional current pulse of a voltage of less than 500 volts, and a switching device responsive to the condition of the arc across said electrodes for closing said current when the arc commences to extinguish.

2. Arc-welding apparatus according to claim 1 wherein said switching device comprises a voltage responsive device operative to close said circuit when the voltage across said electrodes exceeds a predetermined value.

3. Arc-welding apparatus according to claim 1 wherein said source of direct current comprises a condenser, and a high resistance circuit for continuously charging said condenser from an external source of current.

4. Arc-welding apparatus according to claim 1 wherein said switching device comprises a normally inactive gaseous discharge tube connected to be rendered active by an increase in the voltage across said electrodes.

5. Arc-welding apparatus according to claim 4 wherein said gaseous discharge device is provided with a discharge controlling electrode, and including an electron discharge tube controlled by the voltage developed across said welding electrodes for energizing said control electrode.

6. Arc-welding apparatus according to claim 1 wherein said switching device comprises a voltage responsive device, and including a transformer energized by the voltage across said welding electrodes for controlling said voltage responsive device.

7. In an alternating current arc-welding system, the combination of a pair of arc-welding electrodes connected to a source of alternating current, a source of direct current, a normally open circuit for connecting said source of direct current across said welding electrodes to supply direct current thereto, and a switching device responsive to the operating voltage across said welding electrodes for closing said circuit when said operating voltage exceeds a predetermined value.

8. Arc-welding apparatus according to claim 7 wherein said switching device comprises a normally inactive gaseous discharge tube connected in series with said source of direct current across said welding electrodes.

9. Arc-welding apparatus according to claim 8 wherein said gaseous discharge tube is provided with an anode, a cathode, and a control electrode interposed between said anode and cathode, and means controlled by the voltage across said welding electrodes for applying a control potential between said control electrode and said cathode.

10. In an alternating current arc-welding system, the combination of a pair of arc-welding electrodes connected to a source of alternating current, a source of direct current maintained at a voltage of less than 500 volts, a normally open circuit extending between said source of direct current and said arc for applying across said electrodes a portion only of the voltage of said source of direct current, and a switching device responsive to the voltage across said electrodes for closing said circuit when the arc voltage exceeds a predetermined value.

11. In an alternating current arc-welding system, the combination of a pair of arc-welding electrodes connected to a source of alternating current, a source of direct current, a normally open circuit extending between said source of direct current and said arc for applying across said electrodes a unidirectional current pulse, a switching device responsive to the condition of the arc across said electrodes for closing said circuit when the arc commences to extinguish, a spark gap and a condenser connected in series across said welding electrodes, a step-up transformer having its secondary winding connected across said condenser, and switching means for completing said normally open circuit through the primary winding of said transformer whereby a high voltage arc-starting impulse may be applied across said electrodes.

12. An arc-welding apparatus according to claim 1 wherein said normally open circuit is coupled to the welding arc circuit by a transformer which matches the surge set up to the conditions occurring in the welding arc circuit.

13. An arc-welding apparatus according to claim 12, wherein the coupling transformer is a high voltage, step-up transformer, the secondary winding of which charges a high voltage condenser which is connected to break down a spark gap and thus discharge into the welding arc circuit at the predetermined instants determined by the conditions of the arc.

14. An arc-welding apparatus according to claim 13, wherein a single low voltage source connected to pass impulses at timed instants, feeds the impulses to the primary winding of two transformers one of which provides surges in its secondary circuit which flow through the welding arc and the other provides in its secondary winding the high voltage for charging the condenser which breaks down the spark gap and applies the sparks to the welding circuit to ionize the arc gap in readiness for the surges from the first transformer.

15. An arc-welding apparatus according to claim 14, wherein the windings of both transformers are mounted on the same core.

JAMES CHRISTOPHER NEEDHAM.
LEONARD HERBERT HUMPHREY ORTON.

References Cited in the file of this patent

UNITED STATES PATENTS

| Number | Name | Date |
|---|---|---|
| 1,982,327 | Smith | Nov. 27, 1934 |
| 2,235,385 | Rava | Mar. 18, 1941 |
| 2,365,612 | White et al. | Dec. 19, 1944 |
| 2,482,473 | Fromm | Sept. 20, 1949 |
| 2,495,183 | Roberts | Jan. 17, 1950 |